United States Patent

[11] 3,617,370

| [72] | Inventor | Earl D. Myers |
| | | Westfield, N.J. |
| [21] | Appl. No. | 90,350 |
| [22] | Filed | Nov. 17, 1970 |
| [45] | Patented | Nov. 2, 1971 |
| [73] | Assignee | Ohaus Scale Corporation |
| | | Florham Park, N.J. |

[54] APPARATUS FOR REGULATING THE OPERATION OF A SCALE
13 Claims, 7 Drawing Figs.

[52] U.S. Cl. .................................................. 177/185,
177/263, 177/DIG. 5
[51] Int. Cl. ..................................................... G01g 23/10,
G01g 21/22
[50] Field of Search .......................................... 177/184,
185, 187–189, 263, DIG. 5

[56] References Cited
UNITED STATES PATENTS
3,472,327  10/1969  Meier .......................... 177/185

Primary Examiner—Robert S. Ward, Jr.
Attorney—Cifelli, Behr and Rhodes

ABSTRACT: A compound lever scale having a ratio lever beam in an upper housing, operatively connected to a load beam assembly contained in a lower section of the scale. Ratio pans are suspended from the ratio lever beam by knife edges extending perpendicularly from the ratio lever beam to restrain movement of the ratio pans in the plane perpendicular to the length of the ratio lever beam. Magnetic damping means operatively connected to the ratio pans suppress swinging of the ratio pans and oscillations of the entire lever system of the scale. A spring device connecting the ratio lever beam with its housing allows adjustment of torque exerted on the ratio lever beam to enable a rapid zero-adjustment for the entire scale.

INVENTOR
EARL D. MYERS

BY
Capelli & Behr
ATTORNEYS 3,617,370

APPARATUS FOR REGULATING THE OPERATION OF A SCALE

BACKGROUND OF THE INVENTION

1. Field of the Invention

This invention relates to scales, in general, and to means for adjusting the beam levers of scales to produce both a rapid zero-adjustment and means for damping movement of the scale components, in particular.

2. Description of the Prior Art

Compound lever scales have long possessed disadvantages in operation because of their inherent sensitivity. The lever ratio of compound scales, such as ratio-counting scales, is often in the range of 100 to 1, and the scales are designed to count or handle relatively small and light objects. The sensitivity of the scale necessary for the scale to effectively function often causes undue time delays because of difficulties in adjusting the initial zero reading or tare of the scale and because of excessive oscillating movement of the scale components.

In the past, the tare, or zero reading, of counting scales was adjusted by means of a pair of internally threaded rotatable balance balls, operating on a threaded rod attached to the ratio lever beam, with the longitudinal axis of the rod and ratio lever beam either coincident or parallel. The adjustment of the zero reading was accomplished by unlocking the balls, rotating them in the required direction to a new position, and relocking them. After each adjustment, the zero balance is checked and, if still incorrect, the process has to be repeated.

The deficiency of this trial and error zero adjustment is that the equilibrium condition of the ratio lever beam must be disturbed each time the adjustment is made on the balance balls. The ratio lever beam must then be allowed to come to rest and it must be determined if the zero reading is acceptable. If not, the process must be repeated again and again, since it does not provide a method by which the adjustment in the zero reading could be determined during the actual adjustment process.

Another problem associated with compound lever-counting scales relates to the difficulties of damping the oscillations of the lever system and ratio pans of the scale. The ratio pans which depend from the ratio lever beam tend to oscillate in a substantially horizontal plane, while the lever system of the scale oscillates in a vertical plane. Undamped oscillations of the ratio pan will produce a sympathetic oscillation in the entire lever system and vice versa. Therefore, it is necessary to provide damping of the lever system in one plane, and the ratio pans in another and mutually perpendicular plane, to effectively damp the operation of the scale.

In view of the above, it is an object of the present invention to provide a means for quickly and correctly adjusting the zero balance of a lever system scale.

It is a further object of the present invention to provide apparatus for adjusting the zero balance of a lever system scale which allows the operator to observe the extent of the adjustment as it is made.

Still another object of the present invention is to provide apparatus for adjusting the zero balance of a lever system scale which does not require that the equilibrium of the lever system be disturbed in order to adjust the zero reading.

Yet another object of the present invention is to provide apparatus for adjusting the zero reading of a lever system scale which is simple in design, reliable in operation and economical to fabricate.

A further object of the present invention is to provide apparatus for damping the motion of ratio pans suspended from the ratio beam lever of a compound lever-type scale.

Yet another object of the present invention is to provide apparatus for restricting the movement of the ratio pans depending from the ratio beam lever of a compound lever scale in the horizontal and vertical planes.

Still another object of the present invention is to provide apparatus for damping the ratio beam lever of a compound lever-type scale.

Yet another object of the present invention is to provide a means for damping movement of the ratio beam lever of a compound lever-type scale by restraining the ratio pans depending from the ratio beam lever so that the pans will be restrained from movement in two mutually perpendicular planes.

Other objects and advantages will be apparent from the following description of an embodiment of the invention and the novel features will be pointed out hereinafter in connection with the appended claims.

BRIEF DESCRIPTION OF THE DRAWINGS

FIG. 5 is a view of components of the upper section of the scale shown in FIG. 1, with the housing removed.

FIG. 6A is a view taken along line 6—6 of FIG. 3, indicating the effects produced by horizontal movement of a damping vane.

FIG. 6B is a view taken along line 6—6 of FIG. 3, indicating the effects produced by vertical movement of a damping vane.

DESCRIPTION OF THE PREFERRED EMBODIMENT

Figure 1:
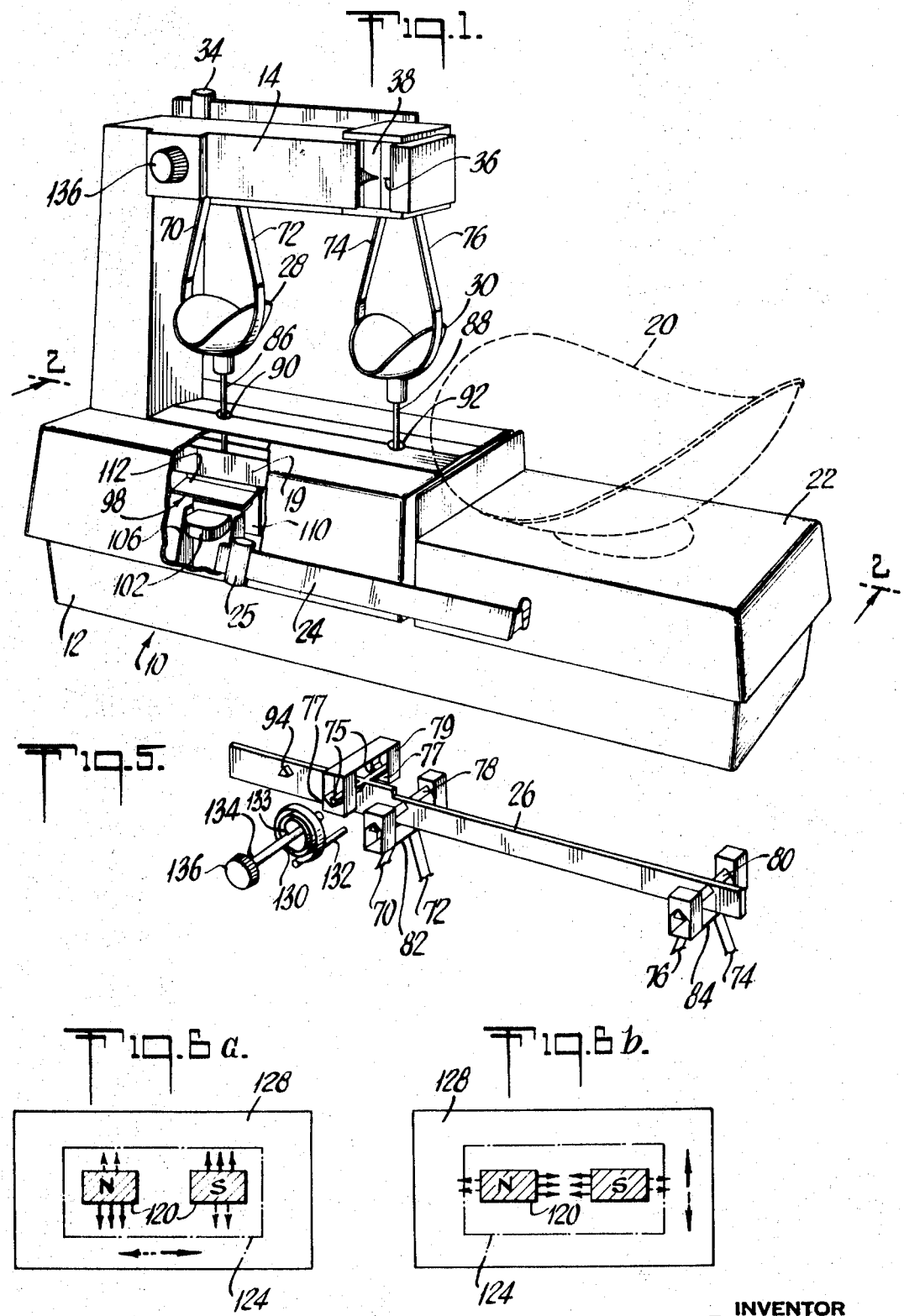
FIG. 1 is a perspective view, partially broken away, of a compound lever-type of counting scale, built in accordance with the teachings of the present invention.

FIG. 1 shows a compound lever-type of ratio counting scale, generally indicated at 10, having a lower housing 12 and an upper housing 14 connected by a vertical housing 16. The lower housing includes a load beam assembly, generally indicated at 18, which includes a main beam lever 17 and an intermediate beam lever 19. A weigh pan 20 disposed on a weigh platform 22 is connected, as seen in FIG. 2, to load beam 18, and a poise bar 24 having a sliding poise 25 extends from the lower housing and can be used to counterbalance the load placed on load platform 22 in order to read the weight on the load platform directly.

Figure 2:
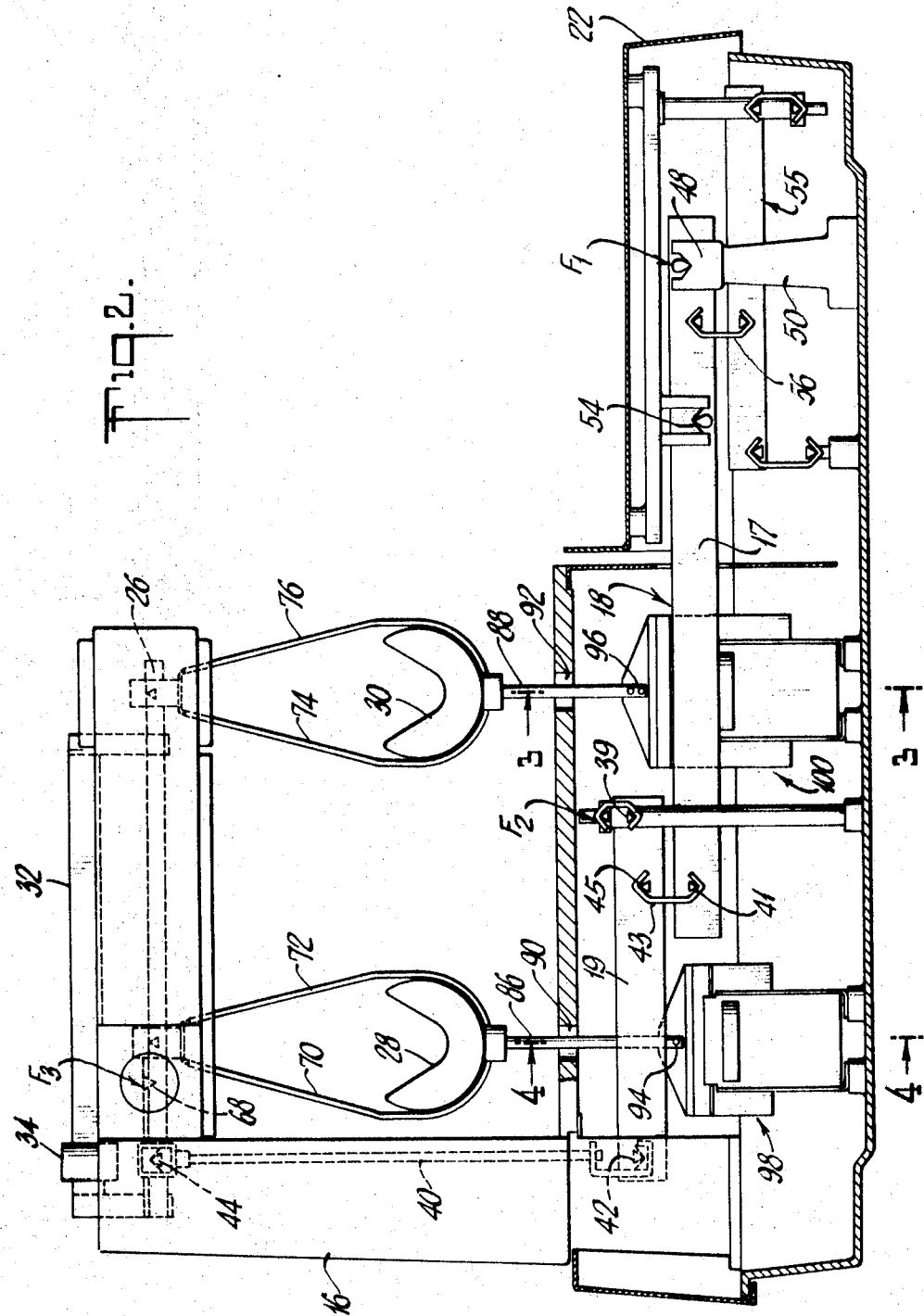
FIG. 2 is a view taken along lines 2—2 of FIG. 1.

As seen in FIG. 2, main beam lever or load beam 17 of load beam assembly 18, is fulcrumed in lower housing 12 by means of knife edges 46 extending from both sides of main lever beam 17 and resting on bearings 48 held in position by pedestal 50 extending upward from the bottom of the housing. The load platform 22 exerts a force on main lever beam 17 primarily through bearings 52 which press downward on knife edges 54 extending from main beam lever 17 and secondarily through a load platform stabilization linkage, generally indicated at 55, which pulls downward through connecting linkage 56 on knife edge 57 extending from main beam lever 17. This type of load platform stabilizing linkage is well known in the trade as a "Beranger linkage".

As seen in FIG. 2, power point 41 of main beam lever 17 applies a force downward on load point 45 of intermediate beam lever or multiplying beam 19, fulcrumed at pivot 39, by means of connecting link 43.

Upper housing 14 contains a ratio beam lever or weigh beam 26, shown in FIG. 2, from which are suspended two scale pans 28 and 30, being closer and further respectively from vertical housing 16, by means of straps which will be described below. A poise bar 32 having a sliding poise 34 is also connected to weigh beam 26 to permit direct indication of the weight of material placed on load platform 22. A pointer 36 on the end of ratio beam lever or weigh beam 26 is viewed through a view window 38 at the end of upper housing 14 to show when the scale is at a proper zero adjustment or in proper balance. A rigid linkage 40, extending through vertical housing 16, connects the power point 42 of multiplying beam 19 to the load point 44 of weigh beam 26 of the scale.

As seen in FIG. 5, weigh beam or ratio lever beam 26 is suspended in housing 14 by knife edges 75 which extend from the weigh beam. The knife edges rest on bearings 77 which in turn are connected to housing 14 (not shown) by means of a bracket 79. Scalepans or ratio pans 28 and 30 are suspended from weigh beam 26 by means of scalepan-hanging means in the form of straps, 70 and 72 for scalepan 28, and 74 and 76 for scalepan 30. As seen in FIG. 5, straps 70 and 72 are connected to bearing bracket 82 and straps 74 and 76 are connected to bearing bracket 84. The bearing brackets are, in turn, suspended from scale pan support means in the form of knife edges 78 and 80 which extend perpendicularly from either side of the weigh beam. Because bearing brackets 82 and 84 connect to knife edges 78 and 80 at points which are at substantial distances perpendicular to the longitudinal axis of weigh beam 26, the scale pans have a great deal of stability to prevent pendulating movement of the pans in the plane perpendicular to the longitudinal axis of the weigh beam. The scale pans 28 and 30 suspended from weigh beam 26 are positioned to provide fixed ratios with relation to a load placed on load platform 22 in the lower housing. For example, scale pan 28 might be at a ratio of 9 to 1 per weight disposed the load platform, while scale pan 30 might have a ratio of 99 to 1.

Both ratio scale pans rest in the straps connected to the knife edges extending from the weigh beam, as mentioned above. Each of the straps in turn is connected to a magnetic damping apparatus which restricts movement of the pan and which will now be discussed.

The scalepan-hanging means, formed by straps 70 and 72, and 74 and 76, provide fairly rigid receptacles in which the scalepans 28 and 30 are placed. Vertical shafts 86 and 88, operatively associated with scale pans 28 and 30 respectively, extend through openings 90 and 92 respectively in lower housing 12 and connect to vane assemblies 94 and 96 which are part of a magnetic damping apparatus, generally indicated at 98 and 100 respectively for pans 28 and 30. The magnetic damping apparatus for each scalepan is enclosed within lower housing 12.

Figure 4:
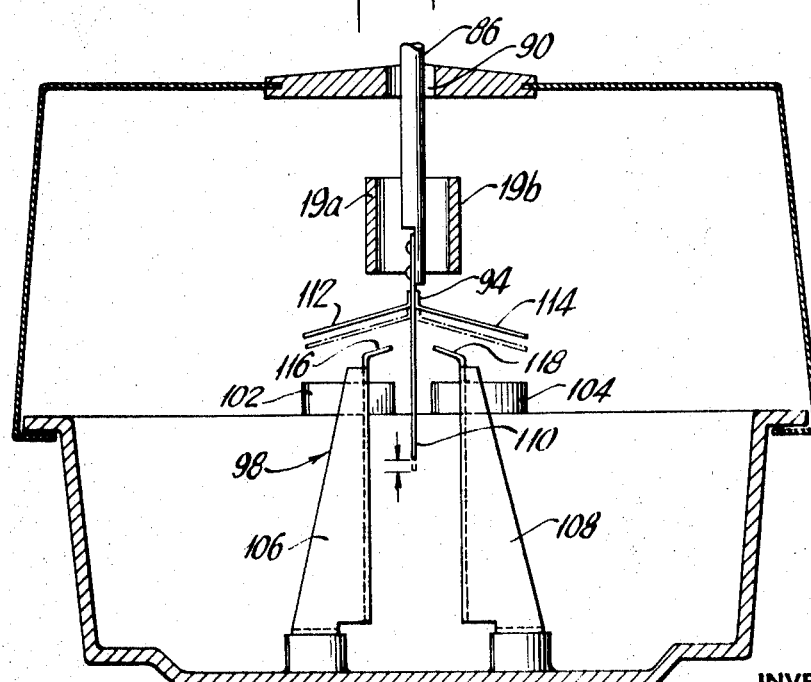
FIG. 4 is a view taken along lines 4—4 of FIG. 2.

As shown in FIG. 4, the magnetic damping apparatus 98 consists of a pair of horseshoe magnets 102 and 104 supported by brackets 106 and 108 respectively, so that the magnets are in spaced relation to each other, with their opposing poles adjacent. A vertical vane 110 of nonmagnetic, electrically conductive material is connected with shaft 86 which extends from the scalepan-hanging means, through arms 19a and 19b of multiplying beam 19. Vane 110 is disposed between the two magnets, so that any motion of the vertical vane, either vertically or horizontally, that crosses the magnetic field between the opposing poles of the magnets 102 and 104 will effectively damp the movement of shaft 86 which, in turn, will restrain movement of scalepan 28 and/or weigh beam 26. The operation of the damping system will be explained in greater detail below. Nonvertical vanes 112 and 114 extend outwardly from the vane assembly 94 and act as shields to prevent small magnetic parts accidentally dropped through opening 90 from reaching magnets 102 and 104. Such parts are deflected and fall harmlessly to the bottom of housing 12.

Figure 3:
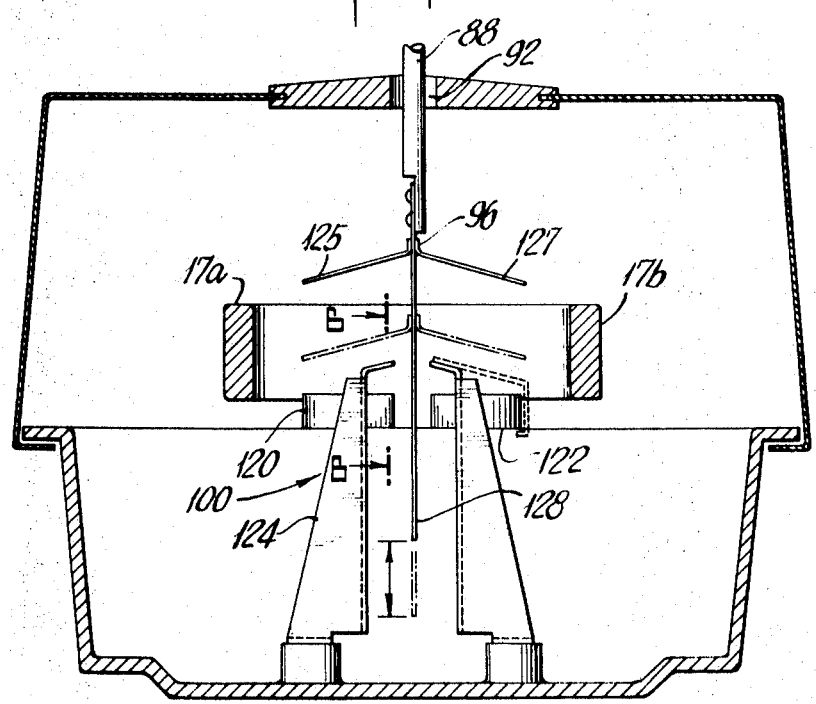
FIG. 3 is a view taken along lines 3—3 of FIG. 2.

As shown in FIG. 3, the damping apparatus for the highcount scalepan 30 is substantially the same as that shown in FIG. 4 with magnets 120 and 122 supported by brackets 124 and 126 and a vertical vane 128 disposed between the magnets connected to vertical shaft 88, extending through the two arms 17a and 17b of load beam 17, which shaft, in turn, is connected to the scalepan-hanging means 74 and 76. The nonvertical shield vanes are indicated at 125 and 127.

The magnetic damping system for the scale damps both the swinging movements of the ratio pans 28 and 30 in a substantially horizontal plane, and at the same time is capable of damping the oscillating movements of the lever system which occur in a substantially vertical plane. The damping system incorporated in the scale is unusual in that it is able to damp in mutually perpendicular planes using a nonuniform magnetic field produced by two coacting conventional-type horseshoe magnets. In the past, it has been necessary to provide a magnetic field of uniform cross section through which the damping vane would pass in order to obtain magnetic damping in two directions. The size of the magnets necessary to produce the uniform magnetic field, and the position of those magnets with relation to the other components of the apparatus, made the use of such magnets unpractical in damping applications for apparatus such as counting scales.

Although the entire theory and actual practice of magnetic damping may not be completely understood, the schematic representations of the effects produced by the damping system in the present invention, shown in FIGS. 6a and 6b, should be sufficient to explain the workings of the invention. FIG. 6a shows the current induced in damping vane 128 by movement of the vane in a substantially horizontal plane across the magnetic field formed between coacting horizontally disposed horseshoe magnets 120 and 122 of magnetic damping apparatus 100, while FIG. 6b shows the current induced in vane 128 by movement of the vane in a substantially vertical plane.

In the following discussion, a left-hand rule is used for determining the direction of current induced in a conducting material moving through a magnetic field. The left-hand thumb, first finger, and middle finger are mutually perpendicularly disposed and respectively point in the direction of the induced current, the direction of the magnetic field (South Pole to North Pole,) and the direction of motion. Using this convention, it can be seen that horizontal movement of the damping vane through the magnetic fields produced by the coacting North and South Poles of magnets 120 and 122 will produce oppositely directed, but unopposing, vertical-induced currents in damping vane 128. Movement of vane 128 horizontally to the right, shown by the heavy horizontal arrow at the bottom of vane 128, will produce the upward and downward currents at the right and left portions respectively of the vane, shown by the heavy vertical arrows eminating from the South and North Poles of magnet 120. Similarly, horizontal movement to the left of vane 128, shown by the dotted horizontal arrow at the bottom of the vane, will produce the downward and upward currents at the right and left portions respectively of the vane shown by dotted vertical arrows eminating from the South and North Poles of magnet 120. These unopposed induced currents produced by the movement of vane 128 coact with the magnetic field of magnets 120 and 122 to tend to inhibit further movement of the vane.

As shown in FIG. 6b, and using the same left-hand rule, vertical movement of damping vane 128 perpendicular to the horizontal magnetic fields between the poles of magnets 120 and 122 will tend to produce substantially horizontal induced currents in vane 128, which currents will be oppositely directed, as in FIG. 6a, but, in addition, will be directly opposed to each other, acting in the same conductive areas of the vane, and, therefore, will tend to cancel each other out to a substantial degree. The resulting net induced current produced in damping vane 128 by vertical movement will be substantially lower than the induced current produced in damping vane 128 by horizontal movement of the vane. The reduced current, therefore, interferes to a much lesser extent with the magnetic flux between the coacting North and South Poles of magnets 120 and 122 and, therefore, produces a significantly smaller damping effect for movement in the vertical plane between poles of adjacent horseshoe magnets than for movement of the vane in the horizontal plane between poles of adjacent horseshoe magnets.

The difference in the damping in mutually perpendicular planes produced by adjacent horseshoe magnets has, in the past, made the use of horseshoe magnets impracticable for applications where damping in more than one plane was desired. Therefore, at a greater cost and at a sacrifice in the size of the damping unit, it was necessary to use larger and different types of magnets to obtain a single, uniform, unidirectional magnetic flux density across the path of the damping vane in order to avoid the cancellation effect produced by the adjacent poles of the horseshoe magnets. However, in the present invention, the incorporation of the magnetic-damping system into the mechanical advantage produced by the lever system of the scale enables the magnetic damping apparatus to be effectively used to damp motion in two mutually perpendicular planes. While the damping force exerted by the damping apparatus against movement of the damping vane in the vertical direction is significantly smaller and may even be one-hundredth the damping force exerted by the damping apparatus against movement of the vane in the horizontal plane, the lever ratio of the scale is also in the order of 100-to-1. Therefore, by damping the power point of the lever with the highest ratio of a multilever system, full utilization of the mechanical advantage of the scale system is obtained and equal damping forces are therefore exerted on the entire scale system, both to prevent oscillation of the pans in the one plane and to prevent oscillation of the lever system in a perpendicular plane.

An adjusting means, shown in FIGS. 1 and 5, provided to regulate the zero balance of weigh beam, will now be described. The weigh beam 26 is fulcrumed in the weigh beam housing 14 by means of a knife edge 75 extending from beam 26 and resting on bearing 77. The bearings in turn are held in a bracket 79 which is suspended from the top of housing 14, in a conventional manner (not shown). A spiral spring 130 has one of its ends 132 connected to the weigh beam and the other of its ends 133 connected to a shaft 134 which is journaled to rotate in the weigh beam housing (not shown). The axis of the shaft is disposed coaxially with the axis of rotation of the weigh beam about its fulcrum with the weigh beam housing. A knob 136 is connected to the end of shaft 134 which end extends through the weigh beam housing 14.

Operation of the weigh beam adjusting means is performed by merely rotating knob 136, which in turn will adjust the tension of spring 130 to adjust the torque exerted by the spring on the weigh beam. In setting the scale for operation to attain the appropriate zero balance, the indicator 36 attached to the end of weigh beam 26 and visible through window 38 in the end of the weigh beam housing 14 is adjusted by rotating the zero-adjustment knob until it lines up in the proper position of window 38.

It will be understood that various changes in the details, materials and arrangements of parts which have been herein described and illustrated in order to explain the nature of the invention may be made by those skilled in the art within the principle and scope of the invention as expressed in the appended claims.

What is claimed is:

1. Means to regulate the operation of a weigh beam of a scale, comprising:
   support means for said weigh beam;
   said weigh beam fulcrumed on said support means;
   a scalepan depending from said weigh beam; and
   magnetic brake means operatively associated with said scalepan to damp substantially horizontal swinging of said scalepan and substantially vertical oscillations of said weigh beam.

2. The means to regulate the operation of a weigh beam of a scale claimed in claim 1, further comprising:
   resilient means operatively associated with said weigh beam and said support means to exert a torque on said weigh beam; and
   adjusting means connected to said resilient means to regulate the torque exerted on said weigh beam to allow the weigh beam to be rapidly adjusted to a zero balance.

3. The means to regulate the operation of a weigh beam of a scale claimed in claim 2 wherein:
   said resilient means include spring means connected to said weigh beam and to said adjusting means; and
   said adjusting means include:
   a shaft journaled in said support means; and
   means to rotate said shaft to adjust the tension of said spring means and thereby control the torque exerted on said weigh beam.

4. The means to regulate the operation of a weigh beam of a scale claimed in claim 3 wherein:
   the axis of said shaft journaled in said support means is disposed substantially coaxially with the axis of rotation of said fulcrum of said weigh beam on said support means; and
   said means to rotate said shaft include knob means disposed at the end of said shaft.

5. The means to regulate the operation of a weigh beam of a scale claimed in claim 1 wherein said magnetic brake means comprise:
   vane means connected to said scalepan and said weigh beam; and
   a plurality of magnetic means adapted to coact with said vane means so that vertical movement of said vane means will produce damping forces of substantially different magnitude than damping forces produced by horizontal movement of said vane means.

6. The means to regulate the operation of a weigh beam of a scale claimed in claim 5 wherein said plurality of magnetic means are disposed on opposite sides of said vane means below said scalepan and said weigh beam.

7. The means to regulate the operation of a weigh beam of a scale claimed in claim 6 wherein said plurality of magnetic means include horseshoe-type magnets disposed on opposite sides of said vane means with all the poles of said magnets disposed in substantially the same plane.

8. The means to regulate the operation of a weigh beam of a scale claimed in claim 7 further comprising:
   a load beam;
   means operatively connecting said load beam to said weigh beam, so that small weights on said weigh beam will counterpoise relatively larger loads on said load beam; and
   said horseshoe magnets are disposed to produce stronger damping by horizontal movement of said vane.

9. The means to regulate the operation of a weigh beam of a scale claimed in claim 8, further comprising means to restrain movement of said scalepan in the plane perpendicular to the plane of rotation of said weigh beam, comprising:
   substantially horizontal scalepan support means extending from each side of said weigh beam, substantially perpendicular to the plane of rotation of said weigh beam; and
   scalepan-hanging means connected to said scalepan and connected at spaced locations on said scalepan support means to prevent swinging of said scalepan in a plane parallel to the plane of said scalepan support means.

10. The means to regulate operation of a weigh beam of a scale claimed in claim 6 wherein said magnetic brake means comprise:
    support means for said magnetic means; and
    said vane means comprise:
    substantially vertical vane means disposed with relation to said magnetic means to produce damping forces in said vertical vane means upon movement of said vertical vane means in a plane parallel to the plane of rotation of said weigh beam;
    nonvertical vane means disposed with relation to said vertical vane means and said magnetic means to act as deflection shields to protect magnetic means from contamination by magnetic particles; and
    means connecting said vertical vane means and nonvertical vane means to said scalepan-hanging means.

11. The means to regulate the operation of a weigh beam of a scale claimed in claim 2, wherein said weigh beam is an element of a compound lever scale, comprising:
    a load beam having a power point and a load point;
    support means for said load beam;
    a multiplying beam having a power point and a load point;
    means connecting said power point of said multiplying beam to said weigh beam;
    a housing disposed about the said weigh beam;
    a housing disposed about said load beam and said multiplying beam;
    said magnetic brake means for said weigh beam disposed in said housing for said load beam; and
    said adjusting means for said weigh beam extending through housing for said weigh beam.

12. The means to regulate the operation of a weigh beam of a scale claimed in claim 11 wherein:
    said resilient means include spring means connected to said weigh beam and to said adjusting means;

said adjusting means includes a shaft journaled in said weigh beam housing; and knob means on the end of said shaft extending through said weigh beam housing to rotate said shaft to adjust the tension of said spring means and thereby adjust the torque exerted on said weigh beam.

13. The means to regulate the operation of a weigh beam of a scale claimed in claim 12 wherein said magnetic brake means include:

magnet means disposed within said load beam housing;

scalepan support means extending from opposite sides of said weigh beam and substantially perpendicular to the plane of rotation of said weigh beam;

scalepan-hanging means connected to said scalepan and connected at spaced locations on said scalepan support means to prevent swinging of said scalepan in a plane parallel to the plane of said scalepan support means;

vertical shaft means connected to said scalepan-hanging means and extending into said load beam housing; and vane means connected to said vertical shaft means and disposed within said load beam housing to coact with said magnetic means to produce damping forces on said vane means upon swinging of said scalepan and upon oscillating of said weigh beam.

* * * * *